Figure 1:
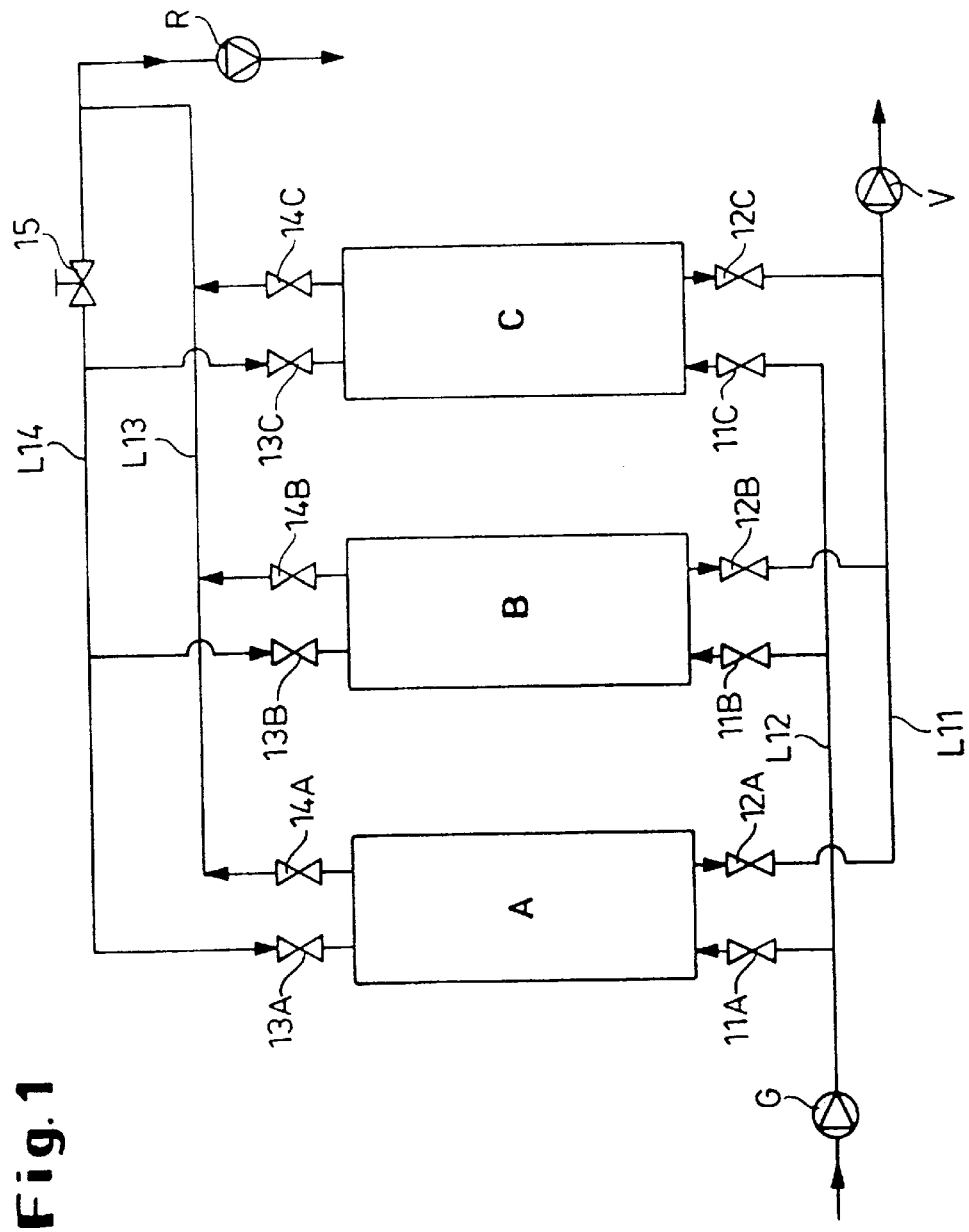

United States Patent [19]
Hees et al.

[11] Patent Number: 6,051,051
[45] Date of Patent: Apr. 18, 2000

[54] BINDER-FREE MOLECULAR SIEVE ZEOLITE GRANULES WHICH CONTAIN ZEOLITES OF THE TYPE LITHIUM ZEOLITE A AND LITHIUM ZEOLITE X

[75] Inventors: Bruno Hees, Langenfeld; Lothar Puppe, Burscheid; Gerhard Reiss, Leverkusen, all of Germany

[73] Assignee: UOP LLC, Des Plaines, Ill.

[21] Appl. No.: 09/323,182

[22] Filed: May 28, 1999

Related U.S. Application Data

[62] Division of application No. 08/969,329, Nov. 13, 1997, Pat. No. 5,962,358.

[30] Foreign Application Priority Data

Nov. 15, 1996 [DE] Germany .......................... 196 47 290

[51] Int. Cl.$^7$ ............................................. B01D 53/047
[52] U.S. Cl. ....................................... 95/96; 95/130
[58] Field of Search ............................. 95/96, 130, 902, 95/97, 98, 100–106, 138; 502/60, 67, 79

[56] References Cited

U.S. PATENT DOCUMENTS

| | | | |
|---|---|---|---|
| 3,356,450 | 12/1967 | Heinze ........................ 23/112 |
| 3,773,690 | 11/1973 | Heinze et al. ................. 252/455 Z |
| 3,816,341 | 6/1974 | Rabo et al. .................... 252/438 |
| 4,859,217 | 8/1989 | Chao ............................ 55/68 |
| 4,950,312 | 8/1990 | Puppe et al. .................. 55/68 |
| 5,098,448 | 3/1992 | Puppe et al. .................. 23/313 P |
| 5,114,440 | 5/1992 | Reiss ........................... 55/25 |
| 5,152,813 | 10/1992 | Coe et al. ..................... 55/26 |
| 5,173,462 | 12/1992 | Plee ............................ 502/67 |
| 5,174,979 | 12/1992 | Chao et al. .................... 423/715 |
| 5,292,360 | 3/1994 | Pacaud et al. ................. 95/90 |
| 5,464,467 | 11/1995 | Fitch et al. .................... 95/98 |
| 5,562,756 | 10/1996 | Coe et al. ..................... 95/96 |
| 5,567,407 | 10/1996 | Coe et al. ..................... 423/700 |
| 5,573,745 | 11/1996 | Li et al. ....................... 423/700 |
| 5,584,912 | 12/1996 | Li et al. ....................... 95/96 |
| 5,604,169 | 2/1997 | Leavitt ........................ 502/60 |
| 5,658,370 | 8/1997 | Vigor et al. ................... 95/96 |
| 5,672,195 | 9/1997 | Moreau et al. ................ 95/96 |
| 5,962,358 | 10/1999 | Hess et al. .................... 502/67 |

FOREIGN PATENT DOCUMENTS

| | | |
|---|---|---|
| 170 026 | 2/1986 | European Pat. Off. . |
| 0297542 | 1/1989 | European Pat. Off. . |
| 0374631 | 6/1990 | European Pat. Off. . |
| 0548755 | 6/1993 | European Pat. Off. . |
| 0785020 | 7/1997 | European Pat. Off. . |
| 154 690 | 4/1982 | German Dem. Rep. . |
| 1203238 | 10/1965 | Germany . |
| 2016838 | 7/1979 | Germany . |
| 3401485 | 12/1985 | Germany . |
| 3 901 784 | 7/1990 | Germany . |

OTHER PUBLICATIONS

Orbit Abstract of EP 0,374,631 (Jun. 27, 1990).
Orbit Abstract of EP 0,297,542 (Jan. 4, 1989).
Orbit Abstract of EP 0,548,755 (Jun. 30, 1993).
Orbit Abstract of DE 1203238 (Oct. 21, 1965).
Orbit Abstract of DE 3401485 (Dec. 5, 1985).
Orbit Abstract of DE 2016838 (Jul. 12, 1979).
Orbit Abstract of DD 154690 (Apr. 14, 1982).
Orbit Abstract of EP 170 026 (Feb. 5, 1986).

*Primary Examiner*—Robert H. Spitzer
*Attorney, Agent, or Firm*—John G. Tolomei; Richard P. Silverman

[57] ABSTRACT

The present invention relates to binder-free molecular sieve zeolite granules of lithium zeolite A and lithium zeolite X, a process for preparing these molecular sieve zeolite granules and their use for preparing nitrogen or oxygen from air by pressure swing adsorption.

1 Claim, 1 Drawing Sheet

BINDER-FREE MOLECULAR SIEVE ZEOLITE GRANULES WHICH CONTAIN ZEOLITES OF THE TYPE LITHIUM ZEOLITE A AND LITHIUM ZEOLITE X

CROSS-REFERENCE TO RELATED APPLICATION

This application is a division of prior application Ser. No. 08/969,329, filed Nov. 13, 1997, now U.S Pat. No. 5,962,358, the contents of which are incorporated herein by reference.

The present invention relates to binder-free molecular sieve zeolite granules which contain zeolites of the type lithium zeolite A and lithium zeolite X, a process for preparing these molecular sieve zeolite granules and their use for preparing nitrogen or oxygen from air by pressure swing adsorption.

The production of oxygen from air at ambient temperatures (e.g. $-30°$ C. to $+50°$ C.) is generally performed on an industrial scale using molecular sieve zeolites. Here, the preferential adsorption of nitrogen as compared with oxygen is used, i.e. oxygen and argon from air are collected as product at the discharge point after the air has passed through a zeolite bed. Desorption of the adsorbed nitrogen can be performed, for example, by reducing the pressure in the bed. In this case, the process is called vacuum swing adsorption (VSA) in contrast to the also known pressure swing adsorption process (PSA), wherein the nitrogen is desorbed at approximately ambient pressure. A continuous VSA process is characterised by the following process steps:

a) passage of air through a zeolite bed (e.g. at ambient pressure) and withdrawal of O2-rich gas from the discharge zone;

b) reduction of pressure in the bed to, for example, about 100 to 400 mbar, using a vacuum pump, in counterflow to the flow of air;

c) filling the bed with O2-rich gas in counterflow to the stream of air or with air in co-current flow with the stream of air to the adsorption pressure or approximately to the adsorption pressure.

The objective of the various processes is always a high product rate, with reference to the amount of zeolite combination used, and a high $O_2$ yield (ratio of the amount of $O_2$ in the product to the amount of $O_2$ in the quantity of air used). A high $O_2$ yield includes a low energy demand (with reference to the amount of $O_2$ produced) for the vacuum pump or air compressor.

As a result of the three steps mentioned above, three zeolites are generally used, i.e. three adsorbers, which are operated in a cycle.

The economic viability of these types of adsorption units is affected by the investment such as, for instance, the amount of adsorption agent and the size of the vacuum pumps and in particular by the operating costs such as, for example, power consumption by the vacuum pump and/or the air compressor. Therefore, zeolites have been developed with which it is possible to achieve high nitrogen adsorptions in the range between the adsorption pressure and minimal desorption pressure, so that the amount of zeolite used can be kept at a low level or even reduced. As described in EP-A 374 631, Ca zeolites A have been used for this purpose. Further developments in this area are directed at increasing the selectivity for nitrogen as compared to oxygen.

Higher selectivity is achieved by using lithium zeolite X (EP-A 297 542). A higher separation factor ($N_2$ loading to $O_2$ loading) and a higher $N_2$ loading are obtained than with Na zeolite X.

U.S. Pat. No. 5,174,979 describes granules bonded with clay minerals, the zeolite fraction consisting of Li zeolite A or Li zeolite X, wherein the $Li_2O/Al_2O_3$ ratio in the Li zeolite A granules is between 10 and 70% and the $Li_2O/Al_2O_3$ ratio in the Li zeolite X granules is between 50 and 95% and the remaining cations are calcium or strontium ions. At an air pressure of 1 bar (abs.), pure lithium zeolite A granules demonstrate an $N_2$ adsorption of only about 0.35 mmol/g. equ.; and the $N_2$ adsorption on Li zeolite X granules at 0.8 bar (abs.) is about 1.1 mmol/g. equ.

Granules consisting of lithium zeolite A can therefore be improved by introducing additional calcium or strontium ions in an exchange process.

In EP-A 0 548 755, it is shown that in the case of lithium zeolite X, the $N_2$ adsorption and $N_2/O_2$ selectivity does not decrease substantially, in comparison with a completely exchanged lithium zeolite X, by introducing calcium and strontium ions as long as the amount of $Na_2O$ in the zeolite lattice remains small. According to FIG. 5 in this document, a zeolite X completely exchanged with lithium has only about 34% higher "nitrogen working capacity" than a zeolite X completely exchanged with calcium ions. According to FIG. 7 in this document, the $N_2/O_2$ selectivity of Ca zeolite is in fact about 10% (in relative terms) better than lithium zeolite X.

In EP-A 297 542, to prepare lithium zeolite X granules, Na zeolite X powder is bonded with clay, then calcined, moistened again, exchanged with a LiCl solution, washed with LiOH and finally activated with a hot stream of gas, i.e. rendered anhydrous.

DE-A 1 203 238 discloses granules which consist of Na zeolite A, in which the $SiO_2$ binder is converted into zeolite A in an after treatment step, a so-called aluminising process. The components called binders are inactive constituents of the granules which bind the zeolite powder to produce granules (beads or sections of extruded strands). The $N_2$ and $O_2$ loading on the inactive binder is minimal.

DE-A 3 401 485 describes the preparation of $SiO_2$-bonded zeolite A and zeolite X granules.

According to EP-A 0 170 026, in particular example 2, fracture resistant granules are disclosed, these consisting of Ca zeolite A and a $SiO_2$ binder and being advantageously used in accordance with EP-A 0 374 631 for the oxygen enrichment of air.

DE-A 1 203 238, in particular example 7, discloses granules which consist of Na zeolite X in which the $SiO_2$ binder has been converted into zeolite A in an aftertreatment step. The disadvantage of zeolite granules which consist of Na zeolite X and/or Na zeolite A and a $SiO_2$ binder is the low fracture strength of these granules, wherein this is independent of the shape of the granules (beads or rods).

Treating the $SiO_2$ binder in zeolite A or zeolite X granules with solutions of salts of alkaline earth metal cations increases the fracture strength of the granules. Converting the inactive $SiO_2$ binder into active Na zeolite A should also increase the adsorption capacity of the entire granular material. Increasing the fracture strength of granules made of sodium zeolite A or sodium zeolite X and a $SiO_2$ binder by treatment with a solution of a lithium salt is not possible.

DD 0 154 690 discloses a process for separating oxygen from gases, wherein binder-free molecular sieve zeolite granules of the type NaLi zeolite A are used (see page 4, Table 1 and page 5, example 1). In Jzv. Akad. Nauk SSSR, Ser. Khim. 1966 (10), 1869 (CA66:70743f), the ion exchange of a sodium zeolite to give Li zeolite A and the X-ray structure of and NMR data for corresponding pellets are also described.

The object was to provide binder-free, but fracture-resistant, Li zeolite granules which can be prepared in a technically simple manner, which can be used for the separation of air in a pressure swing adsorption process and which ensure a high yield for oxygen and high product capacity.

The invention provides abrasion-resistant, fracture-resistant, binder-free molecular sieve zeolite granules which are characterised in that the granules contain finely distributed zeolites of the types Li zeolite A and Li zeolite X.

The granules preferably contain 10 to 90 wt. % of Li zeolite A, preferably 15 to 85 wt. % of Li zeolite A and at the same time 10 to 90 wt. % of Li zeolite X, preferably 15 to 85 wt. % of Li zeolite X.

In particular, the Li zeolite A preferably has a degree of Li exchange of 60 to 100%, with reference to exchangeable cations and the Li zeolite X preferably has a degree of Li exchange of 60 to 100%, with reference to exchangeable cations.

The Li zeolite A preferably contains up to 20 mol-% of divalent cations, and the Li zeolite X preferably contains up to 20 mol-% of divalent cations.

The invention also provides a process for preparing molecular sieve zeolite granules according to the invention which is characterised in that powdered zeolites of the type Na zeolite A and Na zeolite X are mixed with silica sol or other suitable $SiO_2$-containing binders and moulded to give $SiO_2$-bonded granules, the granules obtained in this way are aluminised, wherein the $SiO_2$ binder is converted into Na zeolite A, a Li exchange is performed with the granules treated in this way, wherein 60 to 100% of the exchangeable cations in the zeolite are exchanged and then the exchanged granules are subjected to thermal treatment at temperatures of 300 to 650° C. in order to remove water (so-called activation).

An exchange with divalent cations from the group magnesium, calcium, barium, strontium, zinc, iron, cobalt or nickel, is preferably also performed, before or after Li exchange.

Preferred $SiO_2$-containing binders are, for instance, waterglasses, silica sols, silica gels, aerosils or silica fillers. Silica sols are particularly suitable.

So-called aluminisation in the process according to the invention is performed as follows:

The granules produced by granulation, in the moist state, are placed in contact with an aqueous sodium aluminate solution for several hours at an elevated temperature. The aluminate concentration is chosen to be as high as possible (preferably 0.5 to 2.0 mol of $Al_2O_3$ per liter) in order to keep the volume of treatment solution small. The amount of aluminate solution is such that there are at least 0.5 moles of $Al_2O_3$ to 1 mole of $SiO_2$ binder. More than 0.5 moles of $Al_2O_3$ does not cause any problems. The concentration of caustic in the aluminate solution (treatment solution) may vary between 1.5 and 10 moles of alkali metal hydroxide per liter.

Aluminisation is preferably performed (see also DE-A 1 203 238, example 7) in such a way that, in a first step, the granules are treated with aluminate solution for 0.5 to 15 hours at a temperature of 25° C. to 60° C. Then, in a second step, treatment is continued for 2 to 6 hours at temperatures between 70 and 90° C. The precise treatment times depend mainly on the diameter of the granules. The smaller the diameter of the granules, the shorter the treatment times (residence times). After this procedure, the amorphous $SiO_2$ binder is entirely converted into Na zeolite A (crystalline zeolite phase). After optionally then washing the granules, these may be subjected directly to an ion exchange process.

Activation is preferably performed as follows:

Thermal treatment of the granules takes place at temperatures between 300 and 650° C., this preferably being performed with dry gases such as, for instance, air or nitrogen.

Zeolite granules according to the invention may be used for the separation of air in a pressure swing adsorption process.

The invention is explained in more detail by the following examples.

EXAMPLES

All granular samples had a particle size between 1 and 2.5 mm and were activated to a water content of less than 0.5 wt. % at the end of the preparation process, using a stream of nitrogen heated to 600° C. Activation was performed as follows: The hot stream of nitrogen was passed through a bed consisting of the zeolite granules at a space velocity of 10 $Nm^3N_2/h/10$ $dm^3$ of zeolite, until the discharge temperature reached about 90% of the value of the inlet temperature. The activation time was extended by 20% beyond that point. The hot granules were then packaged. The activation temperatures normally used are 300 to 650° C. The space velocity can be varied over wide limits without any appreciable change in zeolite quality. Atmospheric air may also be used, instead of nitrogen. Dry gas generally reduces the residual water content. In addition to fixed beds, rotating tubes may also be used for activation, the granules being treated continuously in these while the tube is flushed out with a hot stream of gas.

Sample A (Ca zeolite X with $SiO_2$ binder)

Zeolite X granules were prepared in the same way as described in EP-A 0 170 026, example 2. The starting material was granules with approximately 82% of Na zeolite X and 18% of $SiO_2$ as binder, wherein Ca exchange was performed by treating with calcium chloride solution. The $CaO/Al_2O_3$ ratio was about 0.75. The $SiO_2/Al_2O_3$ ratio in the zeolite X powder used was about 2.3. The bulk density of the active granules was 590 g/l.

Sample B (Ca zeolite X without $SiO_2$ binder)

Zeolite X granules were prepared in accordance with DE-A 20 16 838, example 2. The starting material was granules with approximately 82% of Na zeolite X and 18% of $SiO_2$ as binder, wherein the $SiO_2$ fraction was converted into Na zeolite A by treating with aluminate and then a Ca exchange was performed by treating with calcium chloride solution. The $CaO/Al_2O_3$ ratio in the granules was about 0.75. The $SiO_2/Al_2O_3$ ratio in the zeolite X powder used was about 2.3. The bulk density of the active granules was 680 g/l.

Sample C (Li zeolite with $SiO_2$ binder)

Zeolite A granules were prepared in the same way as described in EP-A 0 170 026, example 2. The starting material was granules with approximately 82% of Na zeolite A and 18% of $SiO_2$ as binder, wherein Li exchange was performed by treating with lithium chloride solution. Here, 60 liters of 1-molar lithium chloride solution per liter of granules were pumped through a bed of granules. The temperature was 85° C. After completing the ion exchange process, the granules were washed with water which had been adjusted to a pH of 9 with LiOH. The degree of exchange ($Li_2O/Al_2O_3$) of the zeolite was 98% after ion exchange. The bulk density of the active granules was 600 g/l.

Sample D (mixture of Li zeolite X and Li zeolite A with SiO$_2$ binder)

Zeolite X granules were prepared in accordance with DE-A 20 16 838, example 4d. The starting material was granules consisting of a mixture of approximately 65% of Na zeolite X and 17% of Na zeolite A and 18% of SiO$_2$ as binder, i.e. zeolite proportions of 80% X and 20% A, wherein Li exchange was performed by treating with lithium chloride solution. Here, 70 liters of 1-molar lithium chloride solution per liter of granules were pumped through a bed of granules. The temperature was 85° C. After completing the ion exchange process, the granules were washed with water which had been adjusted to a pH of 9 with LiOH. The degree of exchange (Li$_2$O/Al$_2$O$_3$) of the zeolite was 98% after ion exchange. The SiO$_2$/Al$_2$O$_3$ ratio in the zeolite X powder used was about 2.3. The bulk density of the active granules was 605 g/l.

Sample E (mixture of Li zeolite X and Li zeolite A without SiO$_2$ binder)

Zeolite X granules were prepared in accordance with DE-A 20 16 838, example 4d. The starting material was granules consisting of a mixture of about 65% of Na zeolite X and 17% of Na zeolite A and 18% of SiO$_2$ as binder, wherein the SiO$_2$ fraction was converted into Na zeolite A by aluminate treatment and then, after a wash process, Li exchange was performed by treating with lithium chloride solution. Here, 70 liters of 1-molar lithium chloride solution per liter of granules were pumped through a bed of granules. The temperature was 85° C. After completing the ion exchange process, the granules were washed with water which had been adjusted to a pH of 9 with LiOH. The degree of exchange (Li$_2$O/Al$_2$O$_3$) of the zeolite was 98% after ion exchange. The SiO$_2$/Al$_2$O$_3$ ratio in the zeolite X powder used was about 2.3. The bulk density of the active granules was 660 g/l.

Example F (mixture of Li zeolite X and Li zeolite A without SiO$_2$ binder)

Zeolite X granules were prepared in accordance with DE-A 20 16 838, example 2. The starting material was granules consisting of a mixture of about 82% of Na zeolite X and 18% of SiO$_2$ as binder, wherein the SiO$_2$ fraction was converted into Na zeolite A by aluminium treatment and then, after a wash process, Li exchange was performed by treating with lithium chloride solution. Here, 70 liters of 1-molar lithium chloride solution per liter of granules were pumped through a bed of granules. The temperature was 85° C. After completing the ion exchange process, the granules were washed with water which had been adjusted to a pH of 9 with LiOH. The degree of exchange (Li$_2$O/Al$_2$O$_3$) of the zeolite was 98% after ion exchange. The SiO$_2$/Al$_2$O$_3$ ratio in the zeolite X powder used was about 2.3. The bulk density of the active granules was 650 g/l.

Sample G (Li/Ca zeolite X without SiO$_2$ binder)

Zeolite X granules were prepared in accordance with DE-A 20 16 838, example 2. The starting material was granules with approximately 82% of Na zeolite X and 18% of SiO$_2$ as binder, wherein the SiO$_2$ fraction was converted into Na zeolite A by aluminate treatment and then Li exchange was performed by treating with lithium chloride solution. Here, 60 liters of 1-molar lithium chloride solution per liter of granules were pumped through a bed of granules. The temperature was 85° C. After completing the ion exchange process, the granules were washed with water which had been adjusted to a pH of 9 with LiOH. The degree of exchange (Li$_2$O/Al$_2$O$_3$) of the zeolite was 98% after ion exchange.

Then a Ca exchange was performed by treating with a calcium chloride solution in such a way that the CaO/Al$_2$O$_3$ ratio was adjusted to 0.15.

The SiO$_2$/Al$_2$O$_3$ ratio in the zeolite X powder used was about 2.3. The bulk density of the active granules was 680 g/l.

To assess the samples, the following properties of the activated samples were measured: fracture hardness, nitrogen and oxygen adsorption at 1 bar (abs.) and 25° C. and also the degree of air separation, with reference to oxygen recovery, in a pressure swing adsorption process.

This pressure swing process is explained in more detail using FIG. 1:

The plant consists of the following parts:

G=air blower
V=oil-driven vacuum pump
R=product compressor
A/B/C=adsorbers consisting of metal columns with an internal diameter of 56 mm and an internal length of 2 000 mm; filled with zeolite granules; these columns are surrounded by a water jacket and maintained at a constant temperature of +25° C.
11A–14C=electromagnetic valves
15=manually controlled valve
L11–L14=inlet pipes.

Description of Process

Time 0 to 60 Seconds

Dry air flows, via air blower G, through pipe L12 at an ambient pressure of 1.03 bar (abs.) into adsorber A filled with zeolite granules. O$_2$ product gas leaves adsorber A via valve 14A and reaches product blower R via pipe L13. Product blower R controls the product stream via a restrictor, which is not shown.

At the same time, the pressure in adsorber C is reduced from atmospheric pressure to 200 mbar within 60 seconds, via valve 12C and pipe L11. The final pressure is set using a restrictor, which is not shown, upstream of the vacuum pump.

At the same time adsorber B is filled with product gas, the pressure rising from 200 mbar to atmospheric pressure within 60 seconds, using valve 13B and pipe L14 and manual valve 15.

All valves not mentioned are closed.

Time 60 to 120 Seconds

Air flows through adsorber B. Adsorber C is filled with product. The pressure in adsorber A is reduced.

Time 120 to 180 Seconds

Air flows through adsorber C. Adsorber A is filled with product. The pressure in adsorber B is reduced.

The amount of product downstream of compressor R at 90% and the amount of gas pumped out were determined.

The following characteristics can be calculated. The amount of O$_2$ produced in the product per adsorption cycle of 60 seconds and the O$_2$ yield (=amount of O$_2$ in the product with reference to the amount of O$_2$ in the air used). This O$_2$ yield is an indirect measure of the energy demand for producing oxygen in pressure swing adsorption processes.

The following values were determined:

TABLE 1

| | Fracture hardness [kg] | Adsorption isotherms | | Pressure swing adsorption trial | |
|---|---|---|---|---|---|
| | | N₂ adsorption [Nl/kg] | O₂ adsorption [Nl/kg] | Amount of O₂ [Nl/kg] | O₂ yield [%] |
| Sample A (Ca zeolite X + A with SiO₂ binder), comparison | 2.6 | 14 | 4.8 | 0.7 | 46.2 |
| Sample B (Ca zeolite X + A, without SiO₂ binder), comparison | 3.5 | 14.5 | 4.7 | 0.85 | 48 |
| Sample C (Li zeolite X with SiO₂ binder), comparison | 1.2 | 18 | 3.85 | 1.3 | 57 |
| Sample D (Li zeolite 80% X + 20% A with SiO₂ binder), comparison | 1.2 | 17.2 | 3.8 | 1.25 | 56 |
| Sample E (Li zeolite 65% X + 35% A without SiO₂ binder), according to the invention | 3.1 | 20 | 4.35 | 1.4 | 58.25 |
| Sample F (Li zeolite 80% X + 20% A without SiO₂ binder), according to the invention | 3.1 | 22 | 4.7 | 1.55 | 59 |
| Sample G (Li/Ca zeolite X + A without SiO₂ binder), according to the invention | 4.2 | 24 | 4.98 | 1.65 | 60.5 |

Comparing Samples A and B

The aluminisation step has a positive effect on the $O_2$ product rate in the case of the Ca X+A zeolite granules and no appreciable effect on the $O_2$ yield.

Comparing Sample F with sample C

The aluminisation step provides an improvement in $O_2$ yield and $O_2$ product rate in the case of Li zeolite X.

Comparing Sample F with sample D

For the same zeolite X to zeolite A ratio, the $O_2$ yield and $O_2$ product rate are clearly improved by the aluminisation step.

Comparing Sample G with sample F

The incorporation of Ca ions in Li zeolite (X+A) has increased the $O_2$ product rate and yield still more.

What is claimed is:

1. A pressure swing adsorption process for producing oxygen or nitrogen from air, said process comprising:
    a) passing the air to a zeolite bed containing molecular sieve zeolite granules characterised in that said granules consist essentially of a mixture of zeolites of Li zeolite A and Li zeolite X, said granules containing 10–35 wt-% of Li zeolite A and 65–90 wt-% of Li zeolite X wherein the Li zeolite A was obtained by the conversion of a silicate binder and withdrawing an O2-rich gas from a discharge zone;
    b) counter-currently depressurizing the zeolite bed;
    c) repressurizing the zeolite bed with air or a portion of the O2-rich gas; and,
    d) repeating steps a–c to provide a continuous process.

* * * * *